(12) United States Patent
Gong et al.

(10) Patent No.: US 8,411,631 B2
(45) Date of Patent: Apr. 2, 2013

(54) RESPONSE MECHANISMS FOR WIRELESS NETWORKS USING WIDE BANDWIDTH

(75) Inventors: Michelle X. Gong, Sunnyvale, CA (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/814,014

(22) Filed: Jun. 11, 2010

(65) Prior Publication Data

US 2011/0305205 A1 Dec. 15, 2011

(51) Int. Cl.
*H04W 4/00* (2009.01)
(52) U.S. Cl. ........................................ 370/329
(58) Field of Classification Search .......... None
See application file for complete search history.

(56) References Cited

U.S. PATENT DOCUMENTS

| | | | |
|---|---|---|---|
| 2007/0207823 A1* | 9/2007 | van Nee et al. | 455/509 |
| 2008/0051097 A1 | 2/2008 | Kwon | |
| 2008/0144732 A1 | 6/2008 | Maltsev et al. | |
| 2010/0054199 A1 | 3/2010 | Lakkis | |
| 2010/0202347 A1* | 8/2010 | Sridhara et al. | 370/328 |
| 2011/0134874 A1* | 6/2011 | Nakao et al. | 370/329 |
| 2012/0069795 A1* | 3/2012 | Chung et al. | 370/315 |

FOREIGN PATENT DOCUMENTS

JP 2010074754 4/2010

OTHER PUBLICATIONS

Gong et al., "Legacy Operations in a Mu Mimo Wireless Network", U.S. Appl. No. 12/752,715, filed Apr. 1, 2010, 28 pages.
Office Action received for Japanese Patent Application No. 2011-125933, mailed Nov. 20, 2012, 5 pages including 3 pages English translation.
International Preliminary Report on Patentability received for PCT Patent Application No. PCT/US2011/039931, mailed on Dec. 27, 2012, 6 pages.

* cited by examiner

*Primary Examiner* — John Blanton
(74) *Attorney, Agent, or Firm* — Kacvinsky Daisak PLLC

(57) ABSTRACT

In some embodiments, multiple wireless communication devices that are each transmitting an acknowledgement to the same wide-channel transmission will transmit their acknowledgements simultaneously over different ones of the narrow channels that make up the wide channel, thereby permitting older devices that can't decode the wide channels to determine when the acknowledgement are transmitted.

18 Claims, 6 Drawing Sheets

RESPONSE MECHANISMS FOR WIRELESS NETWORKS USING WIDE BANDWIDTH

BACKGROUND

A data packet that is transmitted by a wireless network controller over a channel with a 40, 80, or 160 MHz bandwidth (composed of multiple channels having a bandwidth of 20 MHz each) will not be received correctly by legacy mobile devices that can only communicate over the 20 MHz channels. Although the legacy devices may not be the intended recipient of such a wide-channel transmissions, not being able to decode the transmission means they also cannot know how long to wait for the intended receiver to finish transmitting an acknowledgement. To avoid forcing the legacy devices to wait for the worst-case delay, current techniques require the acknowledgement to be transmitted in parallel over each of the 20 MHz channels so that the legacy devices can receive them. However, this introduces a new problem. If multiple new devices are addressed by the wide-channel transmission, each one must send its acknowledgement separately in series. This greatly increases the time the legacy devices must wait before they can transmit, thus reducing the capacity of the overall network.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
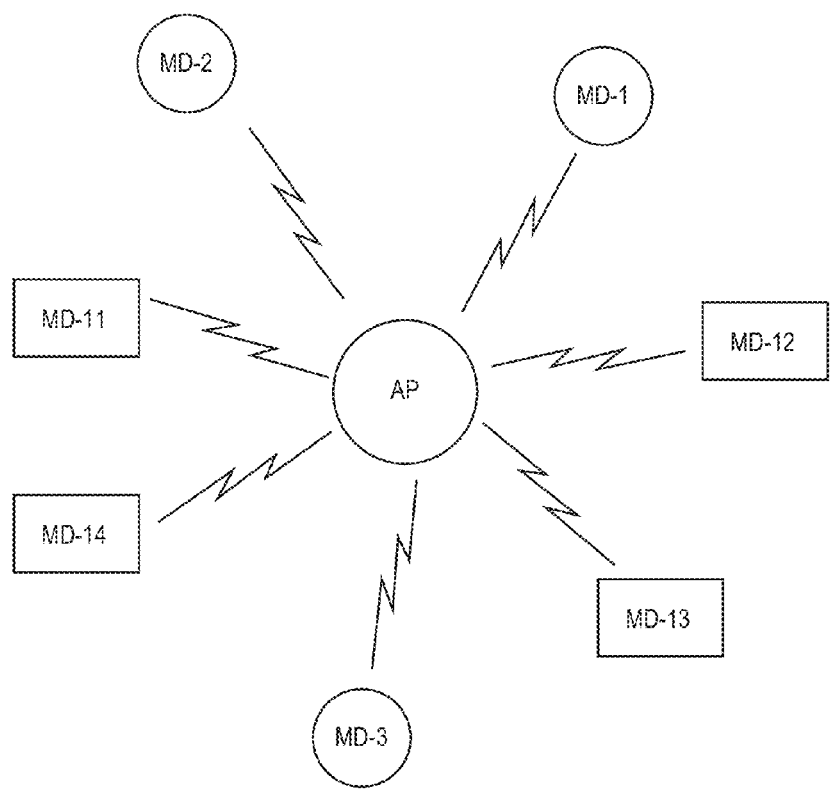
FIG. 1 shows a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used within this document, a 'channel' has a frequency spectrum (a range of frequencies specified for wireless communications) over which various devices are permitted to wirelessly communicate. A 'wide' channel is a channel whose frequency spectrum covers the frequency spectrums of multiple contiguous 'narrow' channels. In this context, the adjectives 'wide' and 'narrow' are defined with respect to each other, but not with respect to any other standard of absolute measurement. In some embodiments, the narrow channels each have a bandwidth of 20 megahertz (MHz), and the associated wide channel has a bandwidth that is an integer multiple of 20 MHz, but other embodiments may be based on narrow channels with other bandwidths.

In some embodiments, multiple wireless communication devices that are each transmitting an acknowledgement to the same wide-channel communication will transmit their acknowledgements simultaneously over different ones of the narrow channels that make up the wide channel. A mechanism is also described that indicates which of the narrow channels each of the devices will use to transmit its acknowledgement. This process permits older mobile devices that can't decode a wide channel to decode the acknowledgements. Although the acknowledgements may not be directed to these older devices, being able to 'overhear' and decode these acknowledgements may permit the older devices to anticipate when the narrow channels will become available. By transmitting these acknowledgements simultaneously rather than sequentially in the conventional manner, the acknowledgement process may be completed faster, freeing up the extra time for other network communications.

FIG. 1 shows a wireless communications network, according to an embodiment of the invention. In the illustrated network, a network controller (in this case an access point AP) is communicating with six mobile devices (MD). MD-11, MD-12, MD-13, and MD-14 are each assumed to be recent-technology devices that can communicate with the AP over a wide channel. MD-1, MD-2, and MD-3 are assumed to be legacy devices that are only able to communicate over narrow channels, and are unable to properly decode a wide-channel communication. For simplicity of explanation, it is assumed that each device in this example is able to hear the transmission from each of the other devices in the network (i.e., the received signal is strong enough to properly receive, whether or not the signal can be decoded into valid data), although in actual practice it is common for some MD's to be out of range of other MD's. Each device (the AP and all the MD's) may include a processor, memory, a radio, and one or more antennas to facilitate their wireless communications.

Figure 2:
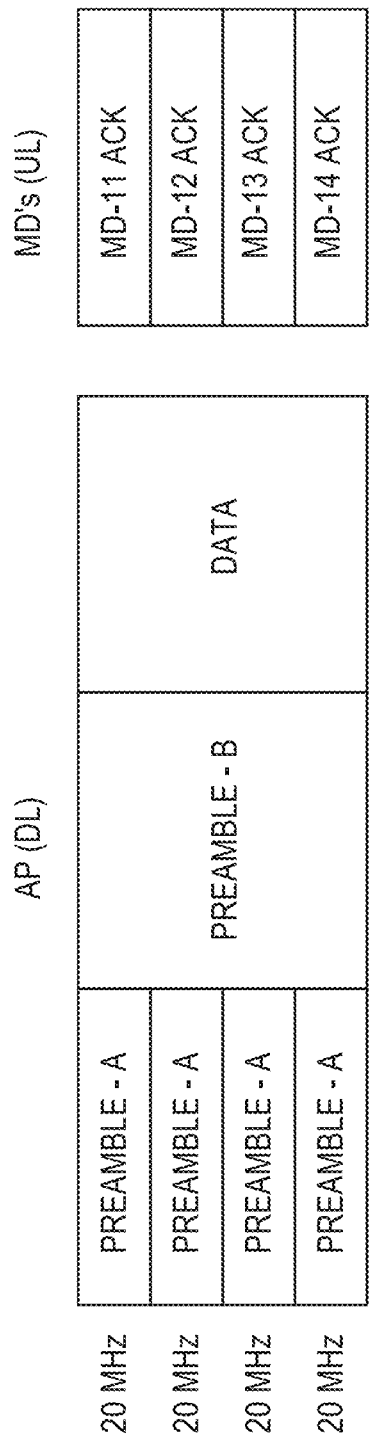
FIG. 2 shows a communication sequence, according to an embodiment of the invention.

FIG. 2 shows a communication sequence, according to an embodiment of the invention. In FIG. 2, the vertical axis represents frequency, in which four contiguous 20 MHz narrow channels occupy the same bandwidth as a single 80 MHz wide channel. The horizontal axis represents time, during which the AP transmits a downlink communication to the MD's over the wide channel, and the addressed MD's (11 through 14) each respond with an uplink acknowledgement over one of the 20 MHz channel. In another embodiment described later, the AP may poll the multiple MD's, which each respond with their own uplink transmissions, and the AP transmits acknowledgements to those uplink transmissions over the indicated narrow channels. In both cases, the downlink transmission defines which narrow channels will be used for each MD for the associated acknowledgement, whether the acknowledgement is an uplink or downlink communication. Note: as used in this document, and in keeping with common industry practice, the term 'downlink' refers to a communication transmitted from an AP to one or more MD's, while the term 'uplink' refers to a communication transmitted from an MD to the AP. In some contexts, the term 'uplink' may also refer to communications from multiple MD's that are received by the AP at the same time.

A network may contain a mixture of new and old devices—those that can operate over both wide and narrow channels and those that can only operate over narrow channels. Further, the specific wide and narrow channels that are assigned for a transmission may change over time. To accommodate this dynamic situation, the transmission may begin with a Preamble-A transmitted simultaneously on each of the narrow channels that constitute a wide channel. Preamble-A may specify that this is to be a wide-channel communication, with enough information in Preamble-A that the wide channel-compliant devices will know how to decode Preamble-B, which is transmitted over the wide channel. Those devices that are unable to decode a wide-channel will know from Preamble-A that they cannot decode Preamble-B, and won't waste resources trying to do so.

After synchronizing on Preamble-B, those devices that are able to do so may begin receiving and decoding the data portion of the transmission, which is transmitted over the wide channel. The data portion may include a header containing information on how to decode the frame, and a frame body containing the content being delivered by the frame to the destination device. In a downlink transmission, in some instances the same body may be transmitted to each MD, by simply including multiple destination addresses in the header. But in other instances separate data may be communicated to each of the addressed MD's in various ways, such as but not limited to: 1) transmitting the content for each MD at different times, 2) transmitting the content for each MD over different sub-channels (e.g., by using OFDMA), 3) transmitting the content for each MD using different coding techniques (e.g., using multi-user multiple-input multiple-output, or MU MIMO), 4) etc.

After completion of this transmission from the AP, each MD that was addressed in the wide channel transmission may respond with an acknowledgement (ACK) to indicate it successfully received and decoded its respective data, or with a non-acknowledgement (NAK) to indicate the reception was not decoded correctly. The examples shown here assume an ACK, but the same principles may be applied to a NAK. In some instances, a block acknowledgement (BA) may be used so the device can acknowledge correct reception of multiple transmissions with a single response.

As previously stated, each MD that was addressed in the wide channel transmission may respond with an ACK on a different narrow channel, as shown in FIG. 2. The example shows a wide channel consisting of four narrow channels, over which the four MD's (MD-11, MD-12, MD-13, MD-14) are responding. As a general rule the maximum number of devices that can simultaneously respond in this manner is equal to the number of narrow channels that make up the wide channel. If there are more MD's than there are available narrow channels, another set of simultaneous acknowledgements may be scheduled to occur after the illustrated first set, on the same narrow channels.

Although the previous description has assumed that multiple MD's are transmitting ACKs in response to a wide-channel transmission from an AP, the same principles may be used when the AP is acknowledging transmissions from multiple MD's. For example, the AP may simultaneously transmit separate ACKs over separate narrow channels, in response to transmissions received from those MD's. But the overall process may be similar, regardless of the direction the ACK travels. For example, the AP may notify each MD of the narrow channel over which the ACK will be communicated. The ACK is then transmitted over that narrow channel, either from AP to MD or from MD to AP, as appropriate. Multiple such ACKs to/from multiple MD's may be scheduled simultaneously in this manner over the narrow channels that constitute the wide channel.

Because network communications are typically dynamic, each MD needs to be notified of which narrow channel it will use for its ACK. This assignment may be communicated from the AP to the MD in the header or payload of a downlink transmission. In some embodiments, each downlink transmission will contain channel assignments for the ACK that apply to that transmission only. In other embodiments, a channel assignment may remain in effect for multiple downlink transmissions, and may need to be communicated only in the first such downlink transmission. The duration of this channel assignment may be previously defined, may be specified along with the channel assignment, or the assignment may be assumed to continue in effect until changed by another assignment. Various protocols may be used to communicate channel assignments.

Figure 3:
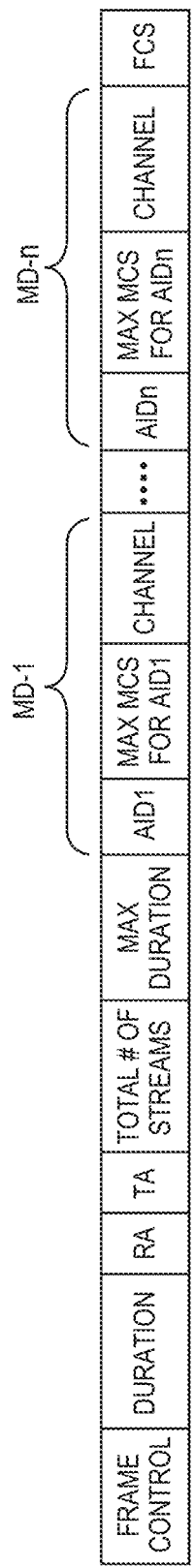
FIG. 3 shows a format for indicating channel assignments for response, according to an embodiment of the invention.

FIG. 3 shows a format for indicating channel assignments for response, according to an embodiment of the invention. The illustrated format is for example only, and should not be used as a limitation on the possible formats that may be used. The illustrated format may follow a standard medium access control (MAC) frame format.

In the illustrated example, the fields labeled Frame Control, Duration, RA (receiver address), TA (transmitter address), and FCS (frame check sequence) may be the same fields that are standard for medium access control (MAC) frames, and are not further defined here. However, in some embodiments the Frame Control field may define this as a clear-to-transmit (CTX) frame. In still other embodiments, a completely different format may be used to communicate the channel assignments.

The Total # of Streams field may indicate the total number of streams that this AP can support in this communication. This total may be more than the total number of MD's, since a single MD may support more than one spatial stream at the same time. The Max Duration field may indicate the maximum allowed length, in time, of each packet.

The remaining fields shown in FIG. 3 may be used to indicate the aforementioned channel assignments. In this example, three fields are devoted to each MD. The Address ID (AID) field may indicate which MD is being described. The Max MCS for AID field may indicate the highest modulation coding scheme (MCS) that the indicated MD may use, although it may use a lower MCS. The Channel field indicates which narrow channel the indicated MD should use for the response. This 3-field set may be repeated as many times in the frame as needed (e.g., 'n' times in the example) to describe the channel assignments for multiple MD's. In another embodiment, when the MCS has been predetermined through some other means, the MCS field may be eliminated, leaving a two-field set for each MD.

The channel number may be indicated in the Channel field in various ways. In one embodiment, a bit map format may be used to indicate the channel number. For example, in an 8-bit field each bit could map to a different one of up to eight channels. A '1' value for a particular bit might indicate that the associated channel is being assigned, while '0''s would be indicated for the remaining seven bits. Of course, the opposite polarities could be used instead. In another embodiment, the value of the field could directly specify the channel number. In still another embodiment, each unique value in the field may be used to map to a different predetermined channel.

Figure 4:
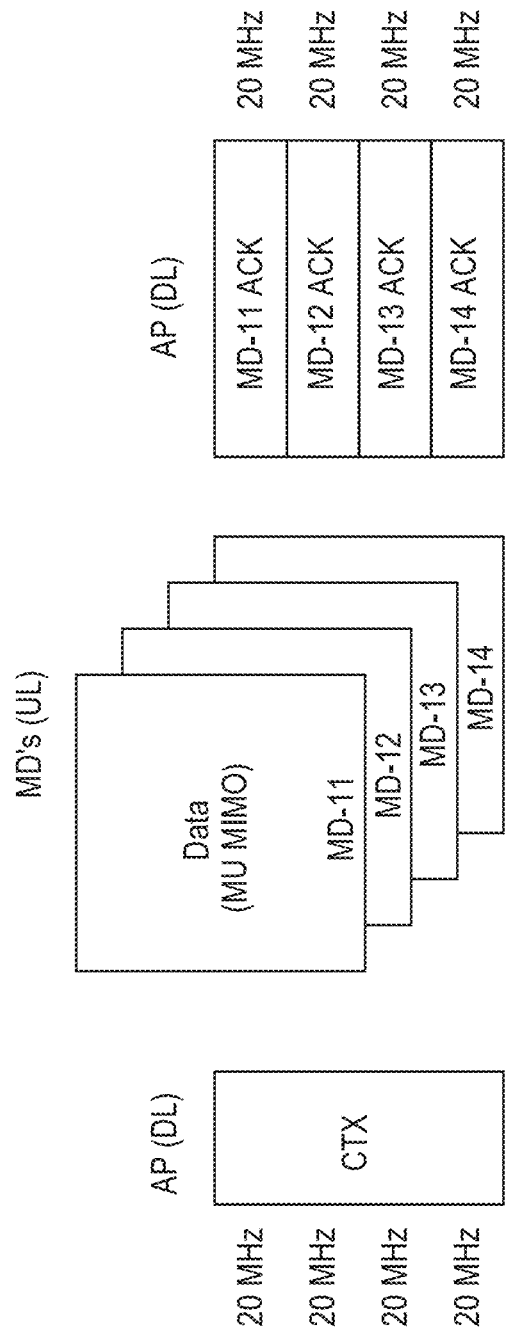
FIG. 4 shows a successful communications sequence, according to an embodiment of the invention.

FIG. 4 shows a successful communications sequence, according to an embodiment of the invention. In the illustrated sequence, the AP polls multiple MD's over a wide channel with a CTX or other invitation to transmit. The CTX includes a channel assignment for each of the MD's, defining which narrow channel will be used for the eventual ACK to each MD. In this instance, the four MD's 11-14 respond to the CTX by transmitting their data to the AP during the same uplink time period. Various conventions and protocols may be used for this uplink, but the example shows the devices following a multi-user multiple-input multiple-output convention over the wide channel. After successfully receiving and decoding the uplink transmissions from all four MD's, the AP may transmit the four ACKs simultaneously over the four narrow channels, with each ACK being transmitted to the respective MD over the narrow channel that was indicated for that MD in the CTX.

Figure 5:
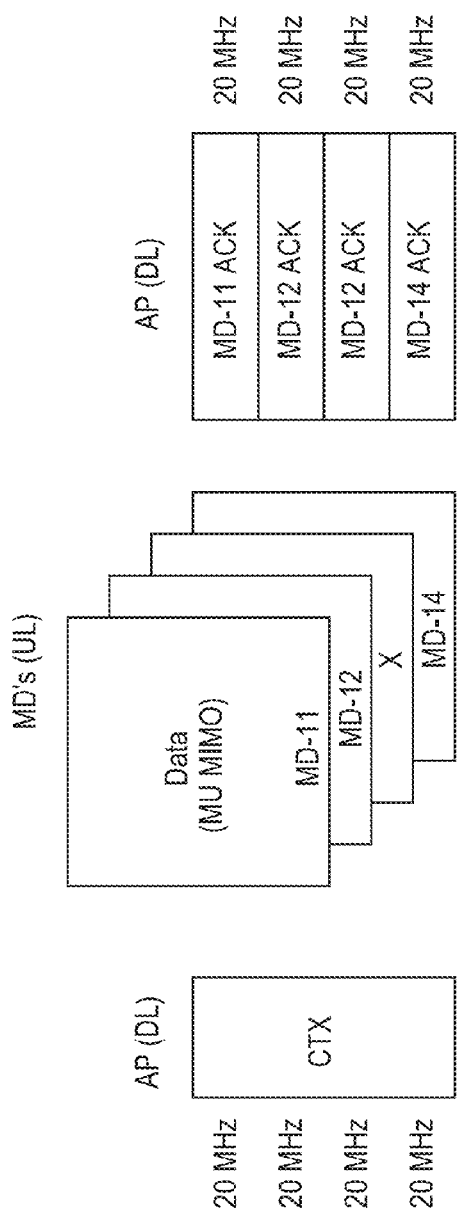
FIG. 5 shows a partially unsuccessful communications sequence, according to an embodiment of the invention.

FIG. 5 shows a partially unsuccessful communications sequence, according to an embodiment of the invention. This example is similar to that of FIG. 4, except that in this instance the uplink transmission from MD-13 was not successfully received. It may have contained so many errors that it could not be successfully reconstructed, the received signal may have been essentially undecipherable, or it may have failed for some other reason. But regardless of the reason, the AP cannot transmit an ACK to indicate a successful reception of the uplink transmission from MD-13. The transmissions from MD-11, 12, and 14 were received successfully, and the ACKs may be transmitted to those devices in the manner of FIG. 4. But the AP needs to let MD-13 know its uplink transmission failed, so that procedures may be initiated to retransmit the message or otherwise deal with this failure.

In some embodiments, the AP may transmit a NAK to MD-13 to indicate the transmission failed. But in other embodiments a NAK may not be a feasible choice, so another means may be found. For example, the wrong ACK may be sent to MD-13 to convey that same message. In this case, the ACK for MD-12 may be transmitted to MD-13 over the narrow channel previously designated for MD-13. When MD-13 receives an ACK addressed to MD-12, MD-13 may interpret that as an indication that its own transmission failed, and it can initiate corrective measures. In some embodiments, a duplicate of an ACK for a correctly received transmission may be transmitted to the wrong device to indicate failure. But in other embodiments, it may not matter whether the incorrectly addressed ACK represents a transmission that was correctly received by any MD. So in theory, all the MD's may be informed that their transmissions failed by simply sending incorrectly addressed ACKs to all of them.

Figure 6:
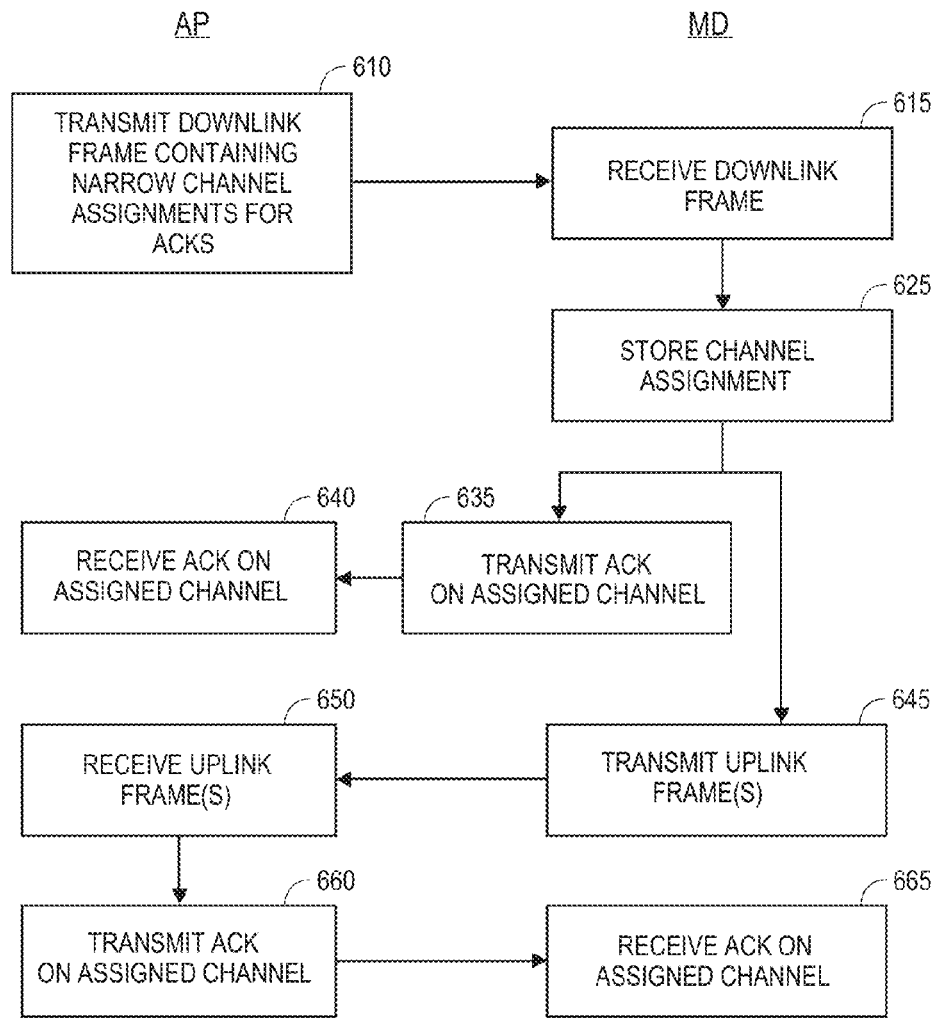
FIG. 6 shows a flow diagram of a method for a wireless communications sequence, according to an embodiment of the invention.

FIG. 6 shows a flow diagram of a method for a wireless communications sequence, according to an embodiment of the invention. In the illustrated example, operations performed by the AP are shown on the left, while operations performed by an MD are shown on the right. At 610 an AP may transmit a downlink frame to multiple MD's over a wide channel, the frame containing information defining which narrow channel each of the MD's should use for communicating a subsequent acknowledgement. At 615, one of the MD's that was addressed in the downlink frame receives it. Although multiple MD's may receive the downlink frame and follow the illustrated process, only one MD is described.

At 625, the MD may store the value of the narrow channel assigned to it, so that information may be used in a later communication. At this point, the flow diagram describes two alternate processes. If the assigned channel is to be used for an uplink ACK, the MD may transmit the ACK on that assigned channel at 635, with the AP receiving it at 640. But if the assigned channel is to be used for a subsequent downlink ACK, the process of 645-650-660-665 may be followed.

For the downlink ACK alternative, the MD may transmit one or more uplink frames to the AP at 645. In some operations, this may be in response to a clear-to-transmit from the AP, or in response to some other invitation to transmit, such as a poll. If the AP correctly receives the uplink frame(s) at 650, it may transmit an ACK to the MD at 660, using the narrow channel that was specified for this MD by the downlink transmission at 610. The MD receives the ACK on the assigned channel at 665.

The foregoing description is intended to be illustrative and not limiting. Variations will occur to those of skill in the art.

Those variations are intended to be included in the various embodiments of the invention, which are limited only by the scope of the following claims.

What is claimed is:

1. A device for communicating in a wireless network, the device comprising a processor, a memory, and a radio, the device operative to:
communicate a clear-to-transmit frame over a wide channel in a wireless communications network, the clear-to-transmit frame to contain a channel assignment in a channel assignment field of the clear-to-transmit frame, the channel assignment field identifying a first narrow channel for communicating an acknowledgement to a transmission; and
communicate the acknowledgement over the first narrow channel;
the wide channel comprising the first narrow channel and at least one other narrow channel.

2. The device of claim 1, wherein:
said transmission comprising the clear-to-transmit frame;
the device operative to communicate the clear-to-transmit frame by transmitting the clear-to-transmit frame in a downlink communication; and
the device operative to communicate the acknowledgement by receiving the acknowledgement in an uplink communication.

3. The device of claim 1, wherein:
the transmission comprising the clear-to-transmit frame;
the device operative to communicate the clear-to-transmit frame by receiving the clear-to-transmit frame in a downlink communication; and
the device operative to communicate the acknowledgment by transmitting the acknowledgement in an uplink communication.

4. The device of claim 1, wherein:
the device operative to communicate the clear-to-transmit frame by transmitting the clear-to-transmit frame in a first downlink communication;
the transmission arranged to occur in an uplink communication subsequent to said communication of the clear-to-transmit frame and prior to said communication of the acknowledgement; and
the device operative to communicate the acknowledgement by transmitting the acknowledgement in a second downlink communication.

5. The device of claim 1, wherein:
the device operative to communicate the clear-to-transmit frame by receiving the clear-to-transmit frame in a first downlink communication;
the transmission arranged to occur in an uplink communication subsequent to said communication of the clear-to-transmit frame and prior to said communication of the acknowledgement; and
the device operative to communicate the acknowledgement by receiving the acknowledgement in a second downlink communication.

6. The device of claim 1, each of the narrow channels comprising a bandwidth of 20 megahertz, and the wide channel comprising a bandwidth that is an integer multiple of 20 megahertz.

7. A method of communicating in a wireless network, comprising:
communicating a clear-to-transmit frame over a wide channel in the wireless communications network, the clear-to-transmit frame containing a channel assignment in a channel assignment field of the clear-to-transmit frame identifying a first narrow channel for communicating an acknowledgement to a transmission; and
communicating the acknowledgement over the first narrow channel;
the wide channel comprising the first narrow channel and at least one other narrow channel.

8. The method of claim 7, wherein:
said transmission comprising the clear-to-transmit frame;
said communicating the clear-to-transmit frame comprising transmitting the clear-to-transmit frame in a downlink communication; and
said communicating the acknowledgement comprising receiving the acknowledgement in an uplink communication.

9. The method of claim 7, wherein:
said transmission comprising the clear-to-transmit frame;
said communicating the clear-to-transmit frame comprising receiving the clear-to-transmit frame in a downlink communication; and
said communicating the acknowledgment comprising transmitting the acknowledgement in an uplink communication.

10. The method of claim 7, wherein:
said communicating the clear-to-transmit frame comprising transmitting the clear-to-transmit frame in a first downlink communication;
the transmission arranged to occur in an uplink communication subsequent to said communicating the clear-to-transmit frame and prior to said communicating the acknowledgement; and
said communicating the acknowledgement comprising transmitting the acknowledgement in a second downlink communication.

11. The method of claim 7, wherein:
said communicating the clear-to-transmit frame comprising receiving the clear-to-transmit frame in a first downlink communication;
the transmission arranged to occur in an uplink communication subsequent to said communicating the clear-to-transmit frame and prior to said communicating the acknowledgement; and
said communicating the acknowledgement comprising receiving the acknowledgement in a second downlink communication.

12. The method of claim 7, each of the narrow channels comprising a bandwidth of 20 megahertz, and the wide channel comprising a bandwidth that is an integer multiple of 20 megahertz.

13. An article comprising a non-transitory computer-readable medium that contains instructions, which when executed by one or more processors result in performing operations comprising:
communicating a clear-to-transmit frame over a wide channel in the wireless communications network, the clear-to-transmit frame containing a channel assignment in a channel assignment field of the clear-to-transmit frame identifying a first narrow channel for communicating an acknowledgement to a transmission; and
communicating the acknowledgement over the first narrow channel;
the wide channel comprising the first narrow channel and at least one other narrow channel.

14. The article of claim 13, wherein:
the transmission comprising the clear-to-transmit frame;
the operation of communicating the clear-to-transmit frame comprising transmitting the clear-to-transmit frame in a downlink communication; and the operation of communicating the acknowledgement comprising receiving the acknowledgement in an uplink communication.

15. The article of claim 13, wherein:
the transmission comprising the clear-to-transmit frame;
the operation of communicating the clear-to-transmit frame comprises receiving the clear-to-transmit frame in a downlink communication; and
the operation of communicating the acknowledgment comprising transmitting the acknowledgement in an uplink communication.

16. The article of claim 13, wherein:
the operation of communicating the clear-to-transmit frame comprising transmitting the clear-to-transmit frame in a first downlink communication;
the transmission arranged to occur in an uplink communication subsequent to said communicating the clear-to-transmit frame and prior to said communicating the acknowledgement; and
the operation of communicating the acknowledgement comprising transmitting the acknowledgement in a second downlink communication.

17. The article of claim 13, wherein:
the operation of communicating the clear-to-transmit frame comprising receiving the clear-to-transmit frame in a first downlink communication;
the transmission arranged to occur in an uplink communication subsequent to said communicating the clear-to-transmit frame and prior to said communicating the acknowledgement; and
the operation of communicating the acknowledgement comprising receiving the acknowledgement in a second downlink communication.

18. The article of claim 13, each of the narrow channels comprising a bandwidth of 20 megahertz, and the wide channel comprising a bandwidth that is an integer multiple of 20 megahertz.

* * * * *

UNITED STATES PATENT AND TRADEMARK OFFICE
CERTIFICATE OF CORRECTION

PATENT NO. : 8,411,631 B2  
APPLICATION NO. : 12/814014  
DATED : April 2, 2013  
INVENTOR(S) : Michelle X. Gong et al.

Page 1 of 1

It is certified that error appears in the above-identified patent and that said Letters Patent is hereby corrected as shown below:

In the Claims:

In column 7, line 67, in claim 7, after "transmit" insert -- frame --.

In column 9, line 7, in claim 15, delete "comprises" and insert -- comprising --, therefor.

Signed and Sealed this
Twenty-first Day of May, 2013

Teresa Stanek Rea
*Acting Director of the United States Patent and Trademark Office*